UNITED STATES PATENT OFFICE.

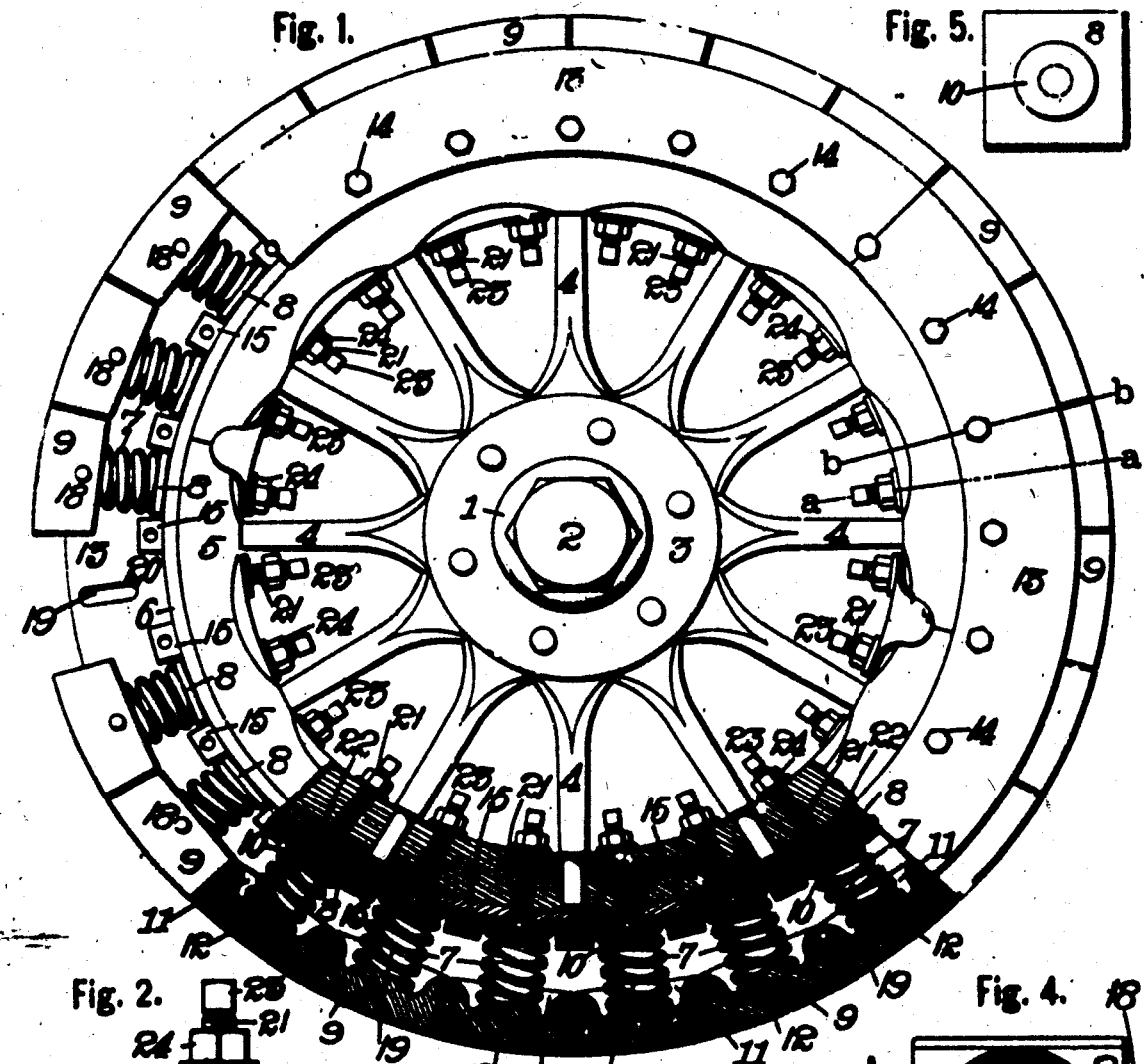

ELI S. WILLIAMSON, OF BUFFALO, NEW YORK.

VEHICLE-WHEEL.

948,621.  Specification of Letters Patent.  Patented Feb. 8, 1910.

Application filed October 5, 1907. Serial No. 396,031.

*To all whom it may concern:*

Be it known that I, ELI S. WILLIAMSON, a citizen of the United States, residing at Buffalo, in the county of Erie and State of New York, have invented a certain new and useful Improvement in Vehicle-Wheels, of which the following is a specification.

This invention relates to an improved vehicle wheel and the object of the invention is to produce a wheel having a non-puncturable yielding tire of very durable qualities and possessing the advantages of the pneumatic tire without the disadvantages thereof.

The invention also relates to certain details of construction, all of which will be fully and clearly hereinafter described and claimed, reference being had to the accompanying drawings in which,—

Figure 1 is a side view of the improved vehicle wheel, part of which is shown in central longitudinal section, and another part of which has its construction exposed to view by the removal of one section of the circular face plate. Fig. 2 is an enlarged transverse section through the improved wheel on line *a a*, Fig. 1. Fig. 3 is an enlarged transverse section through the improved vehicle wheel on line *b b*, Fig. 1. Fig. 4 is an enlarged detached inner face view of one of the tread blocks or sections. Fig. 5 is an enlarged detached view of one of the spring caps. Fig. 6 is an enlarged detached central transverse section through one of the tread blocks showing the outer face or tread covered with a shoe of rubber or similar material.

Like numerals designate like parts in the several figures.

This improved tire is designed to take the place of the pneumatic tire, being greatly superior thereto, not only in economy and durability but as a non-skidding, non-puncturable, and reliable, almost trouble-proof tire.

In Fig. 1 a view of a vehicle wheel equipped with this improved tire is shown in which 1, represents the hub, 2 the hub cap, 3 the hub flange, 4 the spokes, 5 the felly and 6 the rim surrounding the felly. While this is the preferable form of wheel it is obvious that any form of circular wheel may be equipped with the improved tire.

The improved tire in brief consists of a series of spiral springs arranged around the periphery of the wheel rim and a multi-part tread arranged around and yieldingly supported by the springs.

The spiral springs 7, are located at approximately equal distances around the periphery of the rim and in radial alinement with the hub 1, see Fig. 1, and have their inner ends attached to the rim blocks 8, mounted on the rim at intervals, and their outer ends bearing against tread blocks 9, which form the multi-part tread of the tire.

The rim blocks are provided on their outer surface with reduced projections 10, which fit within the inner ends of the springs and the tread blocks 9, are recessed or grooved out as shown at 11, in Figs. 1, 2 and 4, to receive the outer ends of the springs and have reduced projections 12 fitting in said spring ends.

The tread blocks are retained in place between face plates which are fastened to opposite sides of the wheel rim. These face plates are each preferably formed in a series of segments 13, which are secured by bolts 14, to separating blocks 15, fastened at intervals to the rim periphery between the rim blocks.

While the separating blocks may be formed integral with the rim it is preferred to make them separate and fasten them thereto by screws 16, as shown in Fig. 3.

The separating blocks not only serve to support the face plates but also separate and support the rim blocks against longitudinal movement and thus absolutely obviate any creeping of the tire on the rim.

The tread blocks are not only supported against lateral movement between the face plates but are also limited in their radial movement thereby. Each tread block is provided on each of its opposite sides with a circular recess 17, which is screw threaded and in which a screw pin 18, is screwed with its outer end projecting as shown in Fig. 2. These oppositely extending pins 18, project and slide in radial grooves 19, formed in the inner surface of the face plates being limited in their range of movement by the shoulders 20, at the groove ends, Fig. 2.

The tension of the spiral springs is regulated to correspond to the load by means of tensioning bolts 21, which pass radially through the felly and rim at intervals around the wheel and have projecting cone ends 22, which embed in recesses in the inner surface of the rim blocks, see Figs. 1 and 2. The bolts 21 are located in the felly between the spokes, see Fig. 1, and are provided with heads 23, and lock nuts 24 are arranged on the inner projecting portions of the bolts between the heads and inner surface of the felly and are tightened against the inner surface of the felly to lock the bolts in adjusted position.

While the tread blocks may be formed entirely of metal or other suitable material it is obvious that if it is so desired they may be faced with rubber or other yielding practically noiseless material. In fact in Fig. 6, a rubber faced tread block is shown. This block consists of an inner metal member 25, having a central dove tail groove 26, and two side curved and rounded dove tail grooves 27, and an outer rubber member 28, having a central dove tail portion 29, locking in the central groove 26, of the metal member and two side portions 30, locking in the curved side grooves 27. The object of this construction is to securely fasten the rubber member to the metal member by a plurality of dove tail interlocks. It is preferable in this construction to mold the rubber member in place in the metal member.

While the tread blocks as shown are formed of metal or metal and rubber, they may be constructed of any other suitable material if desired.

The great advantages of this invention aside from its reliability and durability reside in its absolute puncture proof quality and the fact that the tread is formed of a plurality of comparatively small blocks, each of which is independent in its movement and is mounted upon an independent spring, thereby supplying in a large measure the resilient qualities of the pneumatic tire without the attendant disadvantage of its liability to puncture.

This improved tire is applicable to motor trucks, automobiles, horse drawn vehicles, and all other traveling conveyances requiring a tire.

I claim as my invention.

1. In a spring wheel, in combination, a rim, two face plates each of which is formed of a series of segments, rim blocks located at intervals on the rim, separating blocks between the rim blocks, means for fastening the face plate segments to the separating blocks, spiral springs having their inner ends engaging the rim blocks, tread blocks forming the tread of the wheel supported on the spiral springs and means for limiting the radial movement of the tread blocks.

2. In a spring wheel, in combination, a rim, two face plates each of which is formed of a series of segments, rim blocks located at intervals on the rim, separating blocks between the rim blocks, means for fastening the face plate segments to the separating blocks, spiral springs having their inner ends engaging the rim blocks, tensioning bolts for said springs, tread blocks forming the tread of the wheel supported on the spiral springs and means for limiting the radial movement of the tread blocks.

3. In a spring wheel, in combination, a rim, two face plates each of which is formed of a series of segments, rim blocks located at intervals on the rim, separating blocks between the rim blocks, means for fastening the face plate segments to the separating blocks, spiral springs having their inner ends engaging the rim blocks, tensioning bolts for said springs passing through the rim and having cone ends embedded in the rim blocks, tread blocks forming the tread of the wheel supported on the spiral springs and means for limiting the radial movement of the tread blocks.

ELI S. WILLIAMSON.

Witnesses:
L. M. SANGSTER,
FREDERICK P. DUCHSCHERER.